United States Patent [19]

Schulte et al.

[11] Patent Number: 4,677,899
[45] Date of Patent: * Jul. 7, 1987

[54] APPARATUS FOR CONTROLLING AN ADJUSTABLE MEMBER

[75] Inventors: Heinz Schulte, Marktheidenfeld; Norbert Mucheyer, Rechtenbach, both of Fed. Rep. of Germany

[73] Assignee: Mannesmann Rexroth GmbH, Lohr, Fed. Rep. of Germany

[ * ] Notice: The portion of the term of this patent subsequent to Apr. 16, 2002 has been disclaimed.

[21] Appl. No.: 832,634

[22] Filed: Feb. 25, 1986

Related U.S. Application Data

[62] Division of Ser. No. 188,453, Sep. 18, 1980, abandoned.

[30] Foreign Application Priority Data

Oct. 5, 1979 [DE] Fed. Rep. of Germany ....... 2940403

[51] Int. Cl.$^4$ ................................................ F15B 11/08
[52] U.S. Cl. .......................................... 91/403; 91/410; 91/461

[58] Field of Search ............... 91/31, 304, 388, 461, 91/403, 410; 251/205, 209

[56] References Cited

U.S. PATENT DOCUMENTS

| 4,510,847 | 4/1985 | Mucheyer | 91/388 |
| 4,574,687 | 3/1986 | Kauss | 91/388 |

Primary Examiner—Abraham Hershkovitz
Attorney, Agent, or Firm—Roylance, Abrams, Berdo & Goodman

[57] ABSTRACT

A fluid operated positioning apparatus includes a multi-position valve operated in response to differential pressure in a fluid control circuit. The control circuit includes two adjustable throttles in series, the junction between the throttles being connected to a control device at one end of the valve. Particular relationships for the throttles are disclosed. Other embodiments include additional throttles for improved control with low pressures.

5 Claims, 5 Drawing Figures

APPARATUS FOR CONTROLLING AN ADJUSTABLE MEMBER

This is a division of application Ser. No. 188,453 filed Sept. 18, 1980, now abandoned.

This invention relates to an apparatus for controlling the position of a movable implement and particularly for a hoisting unit associated with a tractor or the like.

BACKGROUND OF THE INVENTION

It is known as shown in German OS 27 31 164 to provide an apparatus for regulating the position of an adjustable or movable member using a hydraulic apparatus with an operating fluid circuit having a two-way valve operating in two directions and with a control circuit connected to a pressure agent source for actuating the valve, the control circuit being connected to two control devices for the valve and having two adjustable valves or throttles, one of which is disposed between a supply tank and one of the control devices. The other adjustable throttle or valve is disposed between the connection of the control circuit to the second control device and supply tank. The control circuit additionally has two fixed throttles, each of which is connected between the pressure agent source and one of the control devices. In this apparatus, a control pressure in the control circuit is needed in order to cause movement of the slide of the two-way valve, which pressure, depending on the sensitivity of response of the slide, must be a multiple of the valve's minimum response pressure and wherein the product of the control accuracy of the mechanism, expressed in percent, and the multiple of that minimal response pressure equals 100. Considerable control pressures are therefore required.

BRIEF DESCRIPTION OF THE INVENTION

An object of the present invention is to provide an apparatus in which hight operating pressures are controlled with minimum control pressure with great precision.

Briefly described, the invention includes an improved apparatus for positioning an adjustable member as a function of a command signal and a controlled condition, especially for the positioning of a hoisting means on a tractor or the like, the apparatus being of the type including an operating circuit having a bidirectional positionable valve with two control devices for regulating the flow of pressure medium from a supply tank to the adjustable member, a control circuit connected to a control pressure medium source and to the control devices for operating the positionable valve, the control circuit having first and second adjustable throttles, the first one of said throttles being connected between said fluid supply tank and the junction of the control circuit and one of the control devices, the improvement wherein said second adjustable throttle is connected between the control pressure medium source and the junction of the control circuit with said one control device and in series with said first throttle, and said first and second throttles have the same maximum flow passage cross section and are adjustable in the same manner, said maximum cross section being selected such that the cross sectional change of said throttles is determined that to a predetermined minimum adjusting pressure dp min, sufficient to cause response of the valve slide, a rectilinear piece of a diagram showing the pressure depending on the flow passage cross section of the throttle, the minimum necessary change of the flow passage cross section of the adjustable throttle is taken and is multiplied with the predetermined precision factor F, wherein is $F=100/G$ and G is the predetermined sensitivity of said valve, expressed in percent, and $S_{min}$ = the minimum flow passage cross section for each throttle is added thereto.

As will be recognized, two series connected, adjustable throttles are used for the formation of the pressure differential needed for the complete opening of the positionable valve through the two control devices which operate the valve. The pressure prevailing between the two adjustable valves, and thus the pressure in the line connecting these valves, returns to its initial value after completion of the control action. The flow per unit time through the two adjustable valves is proportional to the control value. In the prior art apparatus mentioned above, the pressure generated in the two control devices is proportional to the controlled value when the apparatus is in the controlled state. A relatively small pressure differential is sufficient to move the valve slide to one of its extreme positions. The minimum possible control pressure is slightly higher than twice this pressure for maximum displacement of the slide.

In a particularly advantageous embodiment of the invention, a third throttle is connected between the control pressure agent source and the second control device, and a fourth throttle is connected between the second control device and the supply tank. The throttles used therein may be either fixed or adjustable. If adjustable valves are used, this provides the additional capability of influencing the control circuit such as, for example, adjusting the operating point.

The apparatus can also include additional throttles which make it possible to introduce an additional command signal which, in the case of a tractor, can be used to regulate the position of a plow or the traction of the plow. Both control values affect the positioning element, either alone or in a ratio selected as desired.

Further improvements and features provide the possibility for rapid displacement of the valve slide and thus of the positioning element. The control value previously maintained is restored after the rapid displacement has been completed.

In order that the manner in which the foregoing and other objects are attained in accordance with the invention can be understood in detail, particularly advantageous embodiments thereof will be described with reference to the accompanying drawings, which form a part of this specification and wherein.

Figure 1:
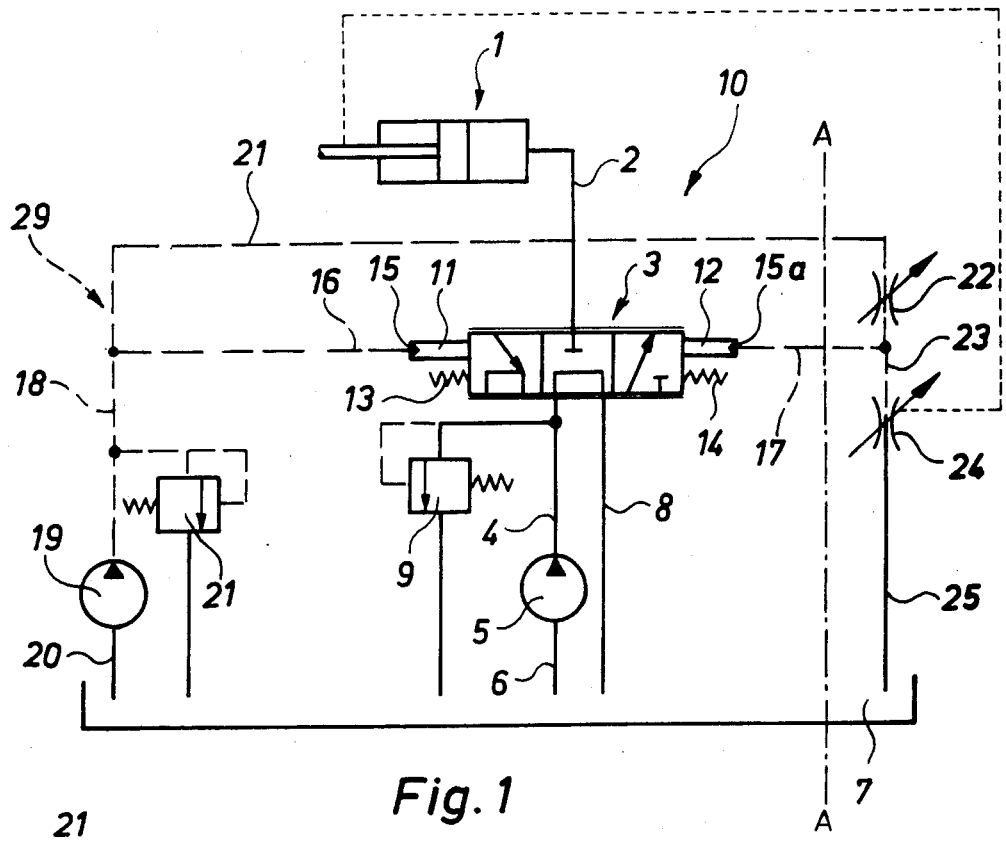
FIG. 1 is a schematic fluid circuit diagram of a first embodiment in accordance with the invention.

Turning now to the Figures in detail, it will be seen that FIG. 1 shows a fluid actuated element, shown as a piston and cylinder assembly 1, for positioning a load member, element 1 being connected by a fluid conducting line 2 to a three-port, three-position valve 3 which is operable by fluid pressure in both directions. One port of the valve 3 is connected to the pressure side of a pump 5, the suction side of the pump being connected by a line 6 to a supply tank 7. A second port of valve 3 is connected directly to tank 7 by a line 8. Line 4 is also connected to one side of a pressure relief or limiting valve 9, the outlet side of which is connected to tank 7. Components 1 through 9 form an operating circuit 10.

Functionally opposite ends of valve 3 are provided with control mechanisms 11 and 12 which, when acted upon by a fluid pressure agent (liquid or gas) attempt to shift the slide portion of the valve in a direction counter to the action of one of the control springs 14 and 13 respectively, in the directions of arrows 15 and 15a, shown in the control mechanisms 11 and 12. The two control springs 13, 14 strive to hold the slide in its middle position whenever the control mechanisms 11 and 12 are not acted upon by fluid pressure. A control line 16 is connected to control mechanism 11 and a control line 17 is connected to control mechanism 12. Line 16 is connected to a control line 18 which is connected to the pressure side of a pump 19, the intake line 20 of which is connected to supply tank 7. A pressure relief or limitation valve 21 is connected to line 18. A control line 21 is also connected to line 18, line 21 leading to an adjustable throttle 22. A control line 23 is connected between adjustable throttle 22 and an adjustable throttle 24 which is, in turn, connected by line 25 to tank 7. Control line 23 is connected with control line 17 which leads to control mechanism 12. The control circuit is designated generally by the reference numeral 29.

The adjustable throttle 22 is developed as a reference value or set point transmitter and the adjustable throttle 24 as a controlled value sensor or receiver, throttle 24 being connected mechanically with the moved part of the adjusting member 1. The control mechanism 11 is designed to have an effective cross-section between about 30% and 70% of the effective cross-section of control mechanism 12, the preferred relationship being 50%, in order to achieve equilibrium at the control slide in the regulated state.

The apparatus of FIG. 1 is initially positioned as illustrated when pumps 5 and 19 are actuated. The flow of fluid pressure from pump 5 to element 1 is controlled by the position of valve 3. The position of valve 3 is controlled by the fluid pressure supplied to control mechanisms 11 and 12 through control circuit 29. By varying the flow through adjustable throttles 22, 24, the pressure supplied to control mechanism 12 can be made greater or less than that supplied to control mechanism 11. If the pressure supplied to control mechanism 12 is greater than that supplied to control mechanism 11, the valve slide of valve 3 will move to the left, as viewed in FIG. 1, placing pump 5 in fluid communication with line 2. However, if the fluid pressure supplied to control mechanism 12 is less than that supplied to control mechanism 11, the valve slide of valve 1 will move to the right, as viewed in FIG. 3, placing element 1 in fluid communication with supply tank 7 to relieve the pressure in element 1.

Figure 4:
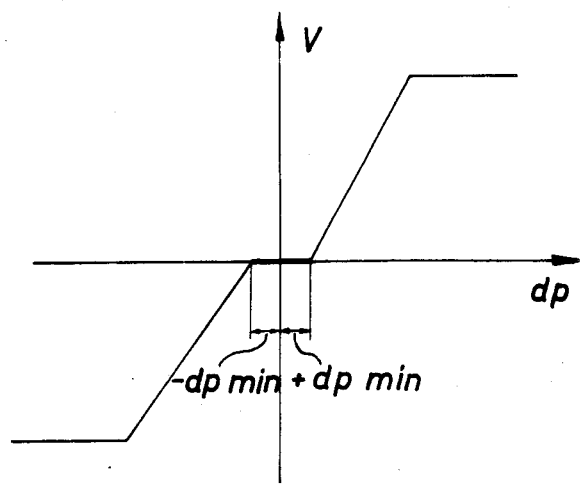
FIGS. 4 and 5 are graphical representations of the volume against differential pressure and throttle surface against pressure, respectively, in the apparatus described.

The graphical representation of FIG. 4 shows the relationship between the volume V flowing through valve 3 per unit time, this flow being conveyed by pump 5, as a function of the differential pressure dp acting on the control mechanisms 11, 12. When the slide of valve 3 is in the middle or neutral position, then it is necessary to produce a differential pressure having a minimum "value dp min" in order to cause the slide to leave its neutral position, permitting the pressure agent to just begin to flow through valve 3.

Figure 5:
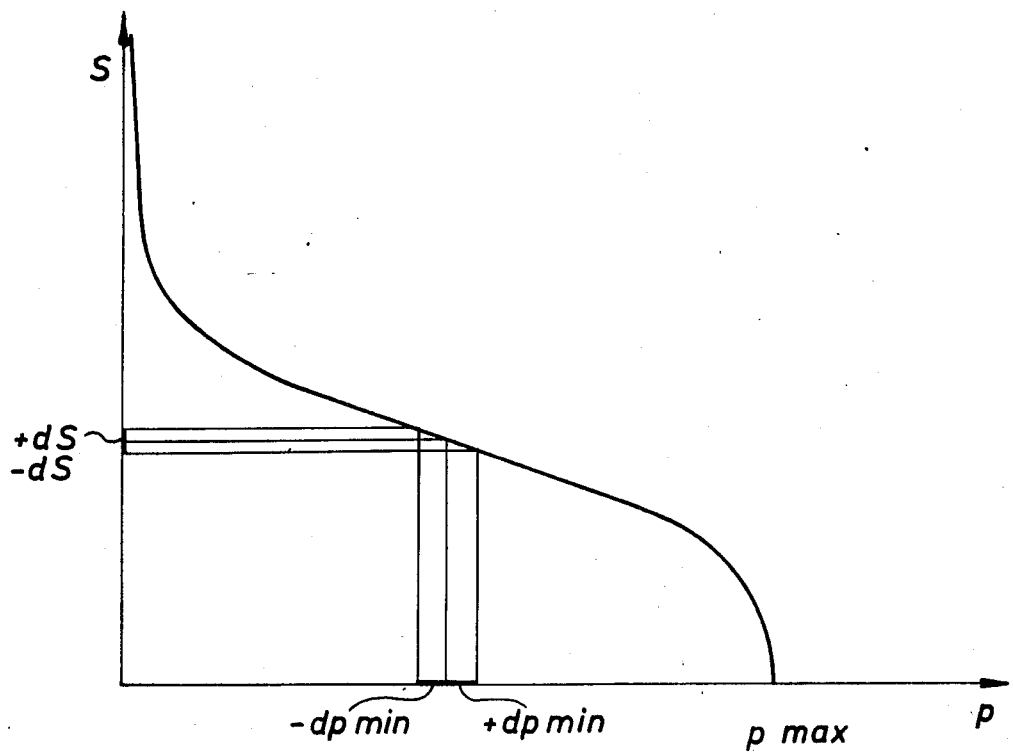

FIG. 5 illustrates the relationship between the cross-sectional areas of a throttle as a function of the pressure px prevailing in front (upstream) of the throttle at a constant conveying pressure P max of the control pump 19 and at a constant setting of the throttle preceding the throttle whose characteristics are plotted. The adjustable cross-section of the throttles 22 and 24 is selected by determining, the middle of the essentially linear portion of the curve shown in FIG. 5, how great the reduction of the cross-sectional area ds of the throttle must be in order to produce the pressure deviation dp min between control mechanisms 11, 12 in either a positive or negative sense.

The precision with which the slide of the valve 3 must respond to a change in cross-sectional area of either one or both of the adjusting throttles 22, 24 depends on a precision G, expressed in percent. The product of this precision G and of a precision factor F, by which ds must be multiplied, in order to obtain the greatest flow cross-section of the throttle required for control, amounts to 100 i.e., for a precision of 2% the precision factor F is equal to 50. The maximally adjustable cross-section area of the throttle 22 results from the sum of the greatest flow cross-section (F×dS) required for control, and of a minimal flow cross-section characteristic $S$min for each adjusting throttle.

By connecting the two adjusting throttles 22, 24 in the series relationship, the result is, as a practical matter, a proportionality of the flow quantity to the controlled value (in the regulated state) wherein the same pressure appears in line 23.

Figure 1A:
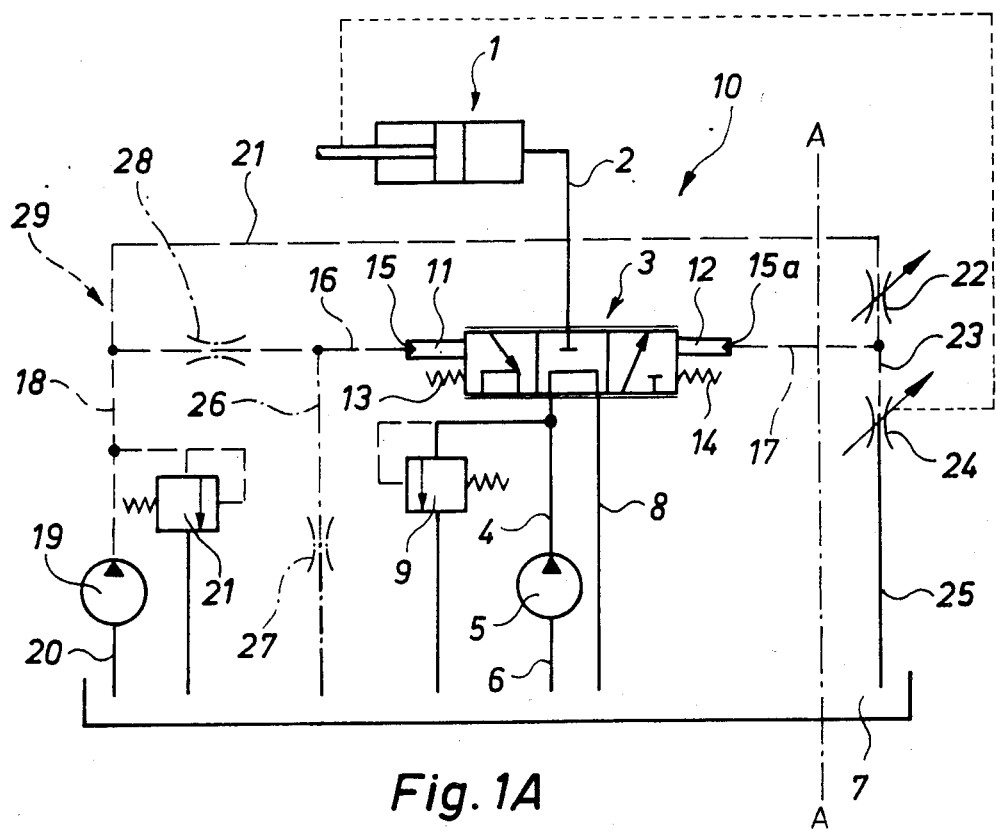
FIG. 1A is a schematic fluid diagram of a variation of the first embodiment of FIG. 1.

As a variation of the first embodiment shown in FIG. 1A, a control line 26, drawn in a dash-dot line, is connected to the control line 16 which contains a throttle 27, also drawn in dash-dot lines, which is connected to supply tank 7. There is also a throttle 28, likewise in dash-dot lines, which is connected to supply tank 7. There is also a throttle 28, likewise in dash-dot lines between the control lines 16 and 18 in this variation. As a result of these elements, the control pressure is reduced. This variation of the apparatus has functional advantages. The control arrangements 11 and 12 in this case can have equal active cross-sectional areas. The two throttles 27, 28 can be made as either fixed throttles or adjustable throttles. As adjustable throttles, they offer the possibility of additionally influencing the control circuit 29, especially for the purpose of calibration.

Throttles 27 and 28 can have variable flow cross-sections. Whenever the flow cross-section of throttle 27 is larger than the flow cross-section of throttle 28, then the pressure is below half of the control pressure, and vice-versa.

Figures 2, 3:
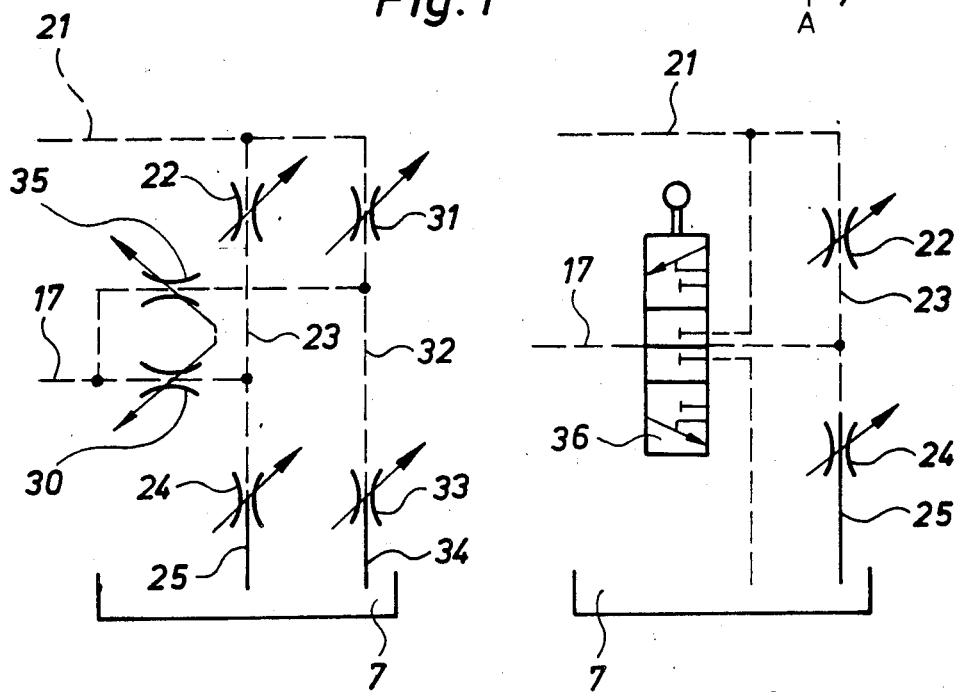
FIGS. 2 and 3 show second and third embodiments in accordance with the invention, these Figures showing modifications to the portion of the circuit to the right of line A—A of FIG. 1.

A second embodiment of the invention is shown in FIG. 2 wherein those components corresponding to those shown in FIG. 1 are given the same reference numerals. As will be recognized, the components shown in FIG. 2 are those which replae those to the right of line A—A in FIG. 1, the components to the left being as shown in FIG. 1. In FIG. 2, an adjusting throttle 30 is inserted between control line 23 and control line 17. An adjusting throttle 31, which is connected to an adjusting throttle 33 via a control line 32, is connected to control line 21, throttle 33 being connected to supply tank 7 through a line 34. The control line 32 is connected with control line 17 through an adjusting throttle 35. The same principals are valid for the development of the adjustment of the adjusting throttles 31 and 33 as for the development of throttles 22 and 24. The two adjusting throttles 30 and 35 are interconnected mechanically in such a way that in one terminal control position of the two adjusting throttles 30, 35, one throttle is closed and the other is open and, in the other terminal control position, the reverse situation obtains. In between these terminal positions, all intermediate positions are possible. The two adjusting throttles 22 and 31 may likewise be mechanically interconnected.

When the apparatus of FIG. 2 is used for the control of the hoisting device of a tractor, then the two adjusting throttles 22, 31 are mechanically interconnected and serve as reference signal input generators. The adjusting throttle 24 serves as a standard or actual value receiver for the control of the position of the hoisting unit (i.e., a feedback signal) and the adjusting throttle 33 as a standard or actual value receiver for the control of the traction of the tractor, or vice-versa. The influence of the standard value, determining the position of the traction or the plow attached to the hoisting mechanism, may be determined on the regulating circuit by means of the two adjusting throttles 30, 35.

In the embodiment shown in FIG. 3, again the parts corresponding to the first embodiment have been identified with the same reference numerals. In this embodiment, a four-port, three-position valve is inserted into the control line 17 and is also connected with the control line 21 and with the supply tank 7. The valve 36 may be operated manually.

In the control position of the valve 36 shown in FIG. 3, the control line 23 is connected with the control device 12 attached to control line 17. Whenever the slide of the valve as shown in FIG. 3, is lowered, then the control line 21 is connected with the control device 12, causing the slide of valve 3 to be shifted in such a way that pump 5 will be connected directly with the adjusting member 1. When the slide in valve 36 assumes the other position, then the slide in valve 3 is shifted in such a way that the adjusting member 1 is connected to supply tank 7. As a result of this, the adjusting member 1 can assume one or the other terminal position without there being any necessity for a change in the adjustment of the reference input value transmitter. When the slide of valve 36 is again moved to its middle position, then the previous standard value is again adjusted.

The standard value may be designated as an actual value and the reference input as a theoretical value.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for positioning an adjustable member as a function of a command signal and a controlled condition, especially for the positioning of a hoisting means on a tractor or the like, the apparatus comprising:
    an operating circuit having a bidirectional positionable valve with a valve slide and with first and second control devices for regulating flow of pressure medium from a supply tank to the adjustable member;
    a control circuit connecting a control pressure medium source to said control devices for said positionable valve, said control circuit having first and second adjustable throttles, said first adjustable throttle being connected between the supply tank and a junction of said control circuit and said first control device, said second adjustable throttle being connected between said control pressure medium source and said junction and in series with said first adjustable throttle;
    said junction being between said first and second throttles and being connnected to said first control device through a fifth adjustable throttle; and
    sixth and seventh adjustable throttles being connected in series between said control pressure medium source and the supply tank, and an eighth adjustable throttle being connected between said first control device and a junction between said sixth and seventh throttles, said fifth and eighth throttles being mechanically coupled for inverse operation.

2. An apparatus according to claim 1 wherein a third throttle is connected between said control pressure medium source and said second control device; and a fourth throttle is connected between said second control device and said supply tank.

3. An apparatus according to claim 1 wherein controlled condition means couples one of said first and second adjustable throttles to a movable part of the adjustable member.

4. An apparatus according to claim 3 wherein said first adjustable throttle is coupled by said controlled condition means to the movable part.

5. An apparatus according to claim 4 wherein said controlled conditions means mechanically couples said first adjustable throttle to the movable part.

* * * * *